Aug. 13, 1946.  H. FRIEDMAN  2,405,572
RADIOGRAPHIC EXPOSURE METER
Filed Aug. 3, 1943
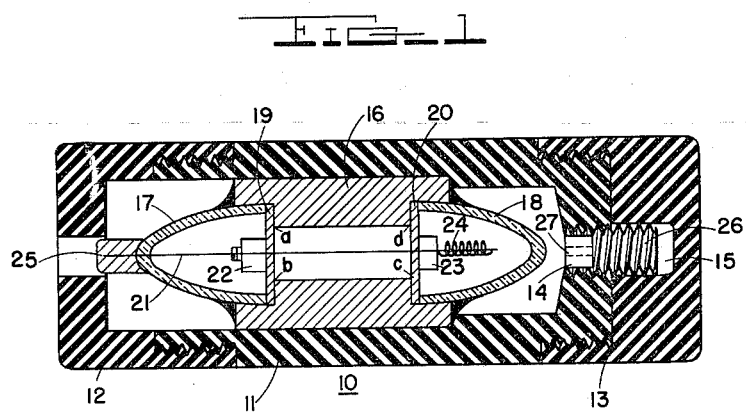
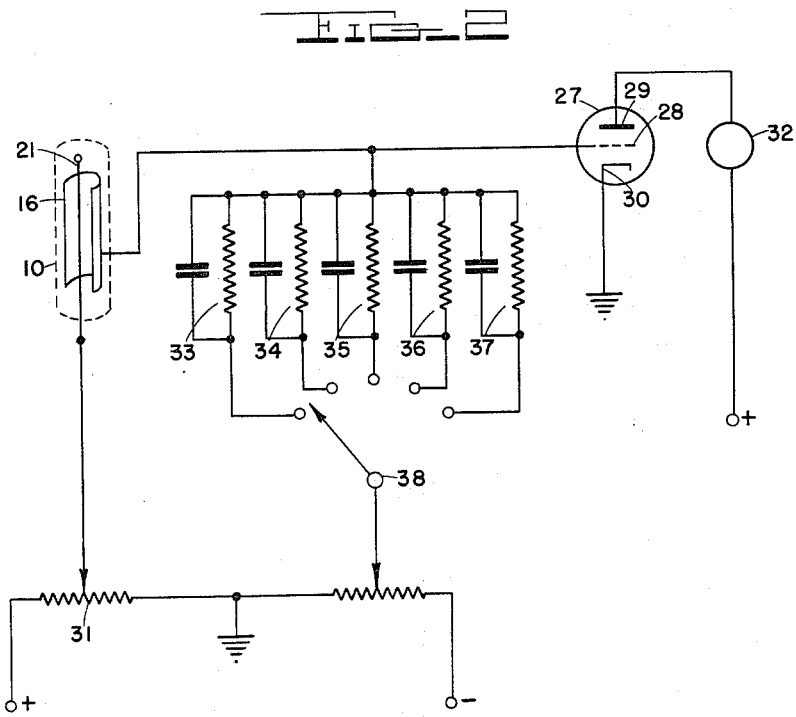
Inventor
HERBERT FRIEDMAN
By
Attorney Patented Aug. 13, 1946

2,405,572

UNITED STATES PATENT OFFICE 2,405,572

RADIOGRAPHIC EXPOSURE METER

Herbert Friedman, Arlington, Va.

Application August 3, 1943, Serial No. 497,271

4 Claims. (Cl. 250—83.6)

(Granted under the act of March 3, 1883, as amended April 30, 1928; 370 O. G. 757)

This invention relates to an exposure meter for the determination of photographic exposures to penetrating radiations and particularly to a form of Geiger-Mueller tube for inclusion in a measuring circuit to make a radiographic exposure meter.

It is an object of the invention to provide a Geiger-Mueller tube for use in an exposure meter sensitive to all penetrating radiations harder than about 100 kilovolt X-rays.

Another object includes the provision of a form of sensitive element having a built-in standard of calibration to check circuit adjustments quickly and to eliminate the need for highly stabilized circuits.

Other objects and advantages will be apparent from the following description.

The invention, accordingly, comprises a radiation intensity measuring and comparing apparatus embodying in a Geiger-Mueller tube the features of construction, combination of elements, and arrangement of parts, which will be exemplified in the construction hereinafter set forth and the scope of the invention will be indicated in the claims.

In order that the invention may be fully understood, it is described in detail with reference to the accompanying drawing in which, Figure 1 is a sectional view of a Geiger-Mueller counter tube for use in the type of measurement to be made;

Figure 2 is a diagram of a frequency measuring circuit which can be employed with the Geiger-Mueller tube to form an exposure meter.

Referring to Figure 1, 10 represents a Geiger-Mueller tube enclosed in an insulating casing which comprises a plurality of sections, 11, 12 and 13, the first being a body section and the other two end pieces. Body section 11 is a substantially cylindrical member open at one end and having an axial hole 14 in the other end. The open end of section 11 is closable by a cap 12 having a hole therein to provide for electrical connection to parts within the case. The closed end of section 11 is made engageable with an internally recessed cap 13, the recess 15 in cap 13 being made to match the hole 14 in the end of section 11 in order to permit the insertion of a standard radiation source into said recess.

The Geiger-Mueller tube proper comprises a radiation permeable body 16, which serves as a cathode fitting snugly in section 11, radiation permeable end caps 17 and 18 sealed to body 16, internal insulating supports 19 and 20, anode 21, and anode guide and tension sustaining means comprising capillary tubes 22 and 23 and spring member 24, respectively. Electrical connection is made to the tube by way of the hole in end cap 12 which is aligned with anode cap 25 on the tube.

In general, in constructing the tube it is desirable to make it of material highly permeable to the radiation which is to be measured. Inasmuch as it is contemplated that the specific tube will find its greatest application in radiography of metals and like materials to determine exposure times, the parts should be of material permeable to X-rays of all degrees of hardness commonly used in such practices, gamma rays, and alpha particles. Since these radiations are all inherently very penetrating, such common materials as glass or quartz for end caps 17 and 18, aluminum, beryllium, copper, brass, or bronze for the tube body 16, and Bakelite, or laminated cloth and Bakelite, for the outer casing, 11, 12, 13, are eminently suitable. Within the tube, the anode 21 is preferably of a high grade wire such as steel piano wire and the spacers 19 and 20 are preferably of mica.

The gas filling of the tube may be any of the gases ordinarily used in Geiger-Mueller tubes, i. e., the inert gases, hydrogen, argon, neon, krypton. I have found that argon in the tube at a pressure of about four centimeters of mercury serves well. A mixture of argon and ethyl alcohol vapor, the partial pressure of the argon being four centimeters and that of the alcohol about four millimeters of mercury, functions well as gas filling for a fast counter.

The construction of the tube is preferably such that a known "active" or "counting" volume is defined by the body 16 and spacers 19 and 20. This volume is preferably predetermined so that its projected area, namely, that identified as the rectangle developed by taking a section through the body and the spacers and indicated by the letters $a, b, c, d$, in Figure 1 is relatively small and known. If the body of the tube 10 be cylindrical and the tube oriented with its longitudinal axis parallel to a given plane, e. g., the plane of a photographic film, the area $abcd$ remains constant for all positions of rotation of the tube about its axis, or movements in the plane of its axis. This has the distinct advantage of causing the active volume of the tube to intercept radiation over a constant irradiated area and makes relatively simple the scanning of a very much larger area. Other geometrical configurations of the tube body can be used, but they have the disadvantage that rotation about the longitudinal or anodic axis of the tube varies the area used to intercept radiation.

In the internal recess 15 within cap 13 there is placed a radiation source in the form of a radioactive button enclosed in container 26. The button is made of known size and material and acts as a constant known source of radiation. By making its container 26 of lead, providing it with a small hole 26a, and fastening the container in place in the recess to align it coaxially with the tube, the emanations from the button can be collimated and directed through the end of the tube proper into its active volume to initiate discharges therein. In this manner, a direct comparison of the unknown radiation intercepted by the active volume of the tube (or the area indicated by abcd in Fig. 1) with the standard source can be achieved. Knowledge of the exposure time required to photograph properly the emanations from the button gives a direct measure of the exposure time needed to photograph any portion of the area scanned.

The manner of using the tube in an exposure meter can be readily understood by reference to Figure 2 which is a circuit diagram of a simple exposure meter employing a Geiger-Mueller tube as a detector in cooperation with a measuring circuit. In the diagram, 10 represents diagrammatically a Geiger-Mueller tube corresponding to that shown in Figure 1 which has a cathode 16 and an anode 21. The Geiger-Mueller tube is connected to an electronic amplifying circuit which includes tube 27, having a grid 28, plate 29 and cathode 30. The tube 27 is shown as a triode for the sake of simplicity but actually can be a tetrode or pentode or like multi-grid tube. The cathode 16 of the Geiger-Mueller tube 10 is connected to the grid of the amplifying tube.

The anode 21 of the Geiger-Mueller tube is held at a high positive direct potential by connection to a potentiometer 31 which voltage should be from about 600–1200 volts and should be regulated well enough to keep the tube in its range of constant operating or counting characteristics. The regulation can be readily accomplished by means of a series of gas regulator tubes connected across the high voltage source in conventional manner.

In the amplifying and measuring circuit comprising tube 27 and meter 32, cathode 30 of the tube is grounded and a positive potential is applied to plate 29 through the meter 32. The ground return of the grid 28 includes any one of several resistance-capacitance circuits 33, 34, 35, 36, or 37, the particular one desired being selected by means of switch 38. In order to maintain the current in tube 27 at a minimum, or zero, when the tube 10 is not being activated by received penetrating radiation, a suitable negative bias is applied to the grid 28 by means of potentiometer 39, the positive end of which is at ground potential.

In operation, when hard radiation impinges on tube 10 and penetrates the active volume, a pulsating current is initiated and flows in the circuit comprising tube 10, the high potential source and one of the resistance capacitance circuits. The capacitance in the circuit serves to average out the irregularities in the current flow so that a substantially constant potential will be applied to the grid 28 of tube 27, which potential will in turn depend upon the fixed bias applied to the grid and the potential drop across the resistance of the said resistance-capacitance circuit. In this manner the frequency and intensity of the current pulses through the counter tube 10 control the magnitude of the current flowing in the tube 27 which is indicated by the meter 32. The indication of the meter thus becomes a measure of the intensity of the radiation to which the tube 10 is exposed.

A variety of sensitivity ranges for the meter can be obtained by providing a selection of grid resistors as shown in Figure 2. When the grid resistance is less than one hundred megohms the current flow through the tube 10 is not appreciably affected by the external resistance and the potential developed at the grid 28 is therefore nearly proportional to the magnitude of the external resistance. By varying the grid resistors in the range from one megohm to one hundred megohms a series of sensitivity ranges can be established to permit determination in a few minutes of exposure times from a few minutes to several hundred hours, the ranges commonly encountered in gamma ray and X-ray radiography.

If the different resistances for the several sensitivity ranges merely served to alter the scale of the amplifier circuit, it would be simpler to provide corersponding shunts for meter 29. The grid resistance, however, does more than merely determine the current gain of the amplifier. A high grid resistance gives a high sensitivity but the response saturates quickly with increasing intensity. The lowering of the grid resistance decreases the amplification but brings about a linear response at high intensities.

When using the device as an exposure meter, the specimen which is to be photographed is interposed between a radiation source such as radium or an X-ray source and the detector tube held in the position which would be occupied by the photographic film. The entire area corresponding to the area of the film can easily be scanned in a few minutes for the sensitivity of the detector is such that a reading which will indicate an exposure time of 100 hours can be made in a few minutes.

Since certain changes may be made in the above construction and different embodiments of the invention could be made without departing from the scope thereof, it is intended that all matter contained in the above description or shown in the accompanying drawing shall be interpreted as illustrative and not in a limiting sense.

The invention described herein may be manufactured and used by or for the Government of the United States of America for governmental purposes without the payment of any royalties thereon or therefor.

I claim:

1. A Geiger-Mueller tube for comparing hard radiation of unknown intensity with hard radiation of a known intensity comprising, a radiation-permeable tubular member forming a cathode, an anode extending axially therethrough, insulating disks closing the ends of said cathode thereby defining an active tube volume, a radiation permeable envelope for said anode, cathode, and disks, and means for exposing the active volume defined by the cathode of said tube to a source of constant radiation impinging on said tube from a direction substantially coaxial with the tube axis.

2. A Geiger-Mueller tube for measuring the intensity of hard radiation comprising, a radiation-permeable tubular member forming a cathode, said cathode having its ends closed by insulating disks thereby defining a fixed active volume, an anode extending axially therethrough and means for exposing said tube to a source of constant radiation impinging on said tube from a direction substantially coaxial with the tube.

3. A Geiger-Mueller tube for measuring the intensity of penetrating radiation comprising, a radiation-permeable tubular member forming a cathode, mica disks closing the ends of said cathode thereby defining a fixed active counting volume, an anode wire extending axially therethrough, and means comprising a recessed container associated with said tube having a known quantity of radioactive material therein and a radiation-collimating aperture for directing radiation into the tube for exposing said active volume to a collimated constant known source of radiation impinging on said tube from a direction substantially parallel to the axis of said tube.

4. A Geiger-Mueller tube for comparing the intensity of penetrating radiation of unknown intensity with penetrating radiation of known intensity comprising, a radiation-permeable metallic tubular member forming a cathode, said cathode being closed at its ends by mica disks to define a fixed active volume having a constant projected area in a plane parallel to its longitudinal axis, an anode extending axially therethrough and means comprising radioactive material in a recessed container associated with said tube for exposing said active volume to radiation collimated by the exit from said container in a direction substantially parallel to the longitudinal axis of the tube.

HERBERT FRIEDMAN.